United States Patent [19]

Smith

[11] 4,435,102
[45] Mar. 6, 1984

[54] TIE DOWN CONNECTOR

[76] Inventor: Robert G. Smith, 2707-½ Rockefeller La., Redondo Beach, Calif. 90278

[21] Appl. No.: 340,863

[22] Filed: Jan. 20, 1982

[51] Int. Cl.³ .............................................. F16G 11/00
[52] U.S. Cl. .................................... 403/206; 403/213; 24/129 C
[58] Field of Search ....................... 403/206, 209, 213; 24/261 F, 230.5 W, 129 C, 131 C; 294/92; 410/77, 101, 104

[56] References Cited

U.S. PATENT DOCUMENTS 760,819  5/1904  Strunk ...................... 24/129 C UX
1,356,316 10/1920 Shepherd .................. 24/131 CU X

FOREIGN PATENT DOCUMENTS 408596  1/1955  Italy .................................... 403/209

Primary Examiner—Wayne L. Shedd
Attorney, Agent, or Firm—Roger A. Marrs

[57] ABSTRACT

A connector is disclosed herein for releasably securing a hooked end of a bungee cord to a supporting element which includes a linear body section terminating at one end in a double socket holder for engaging the supporting element and terminating at its opposite end in a conical receptacle for insertably receiving and holding a selected one of the bungee cord ends. This double socket is formed with openings facing from opposite directions and are joined at one side by a solid portion while its opposite or corresponding side is open or deformable so as to permit insertion and manipulation of the supporting element there through.

7 Claims, 10 Drawing Figures

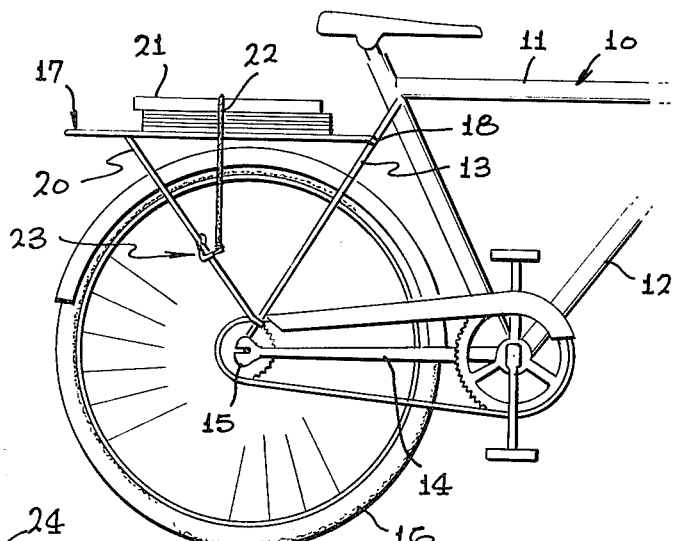
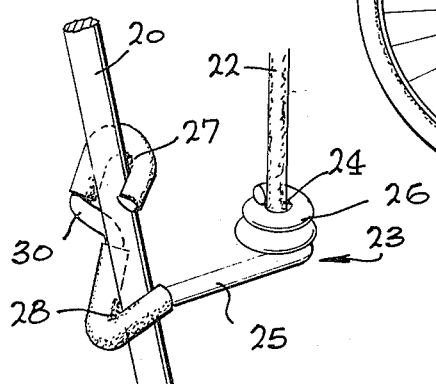
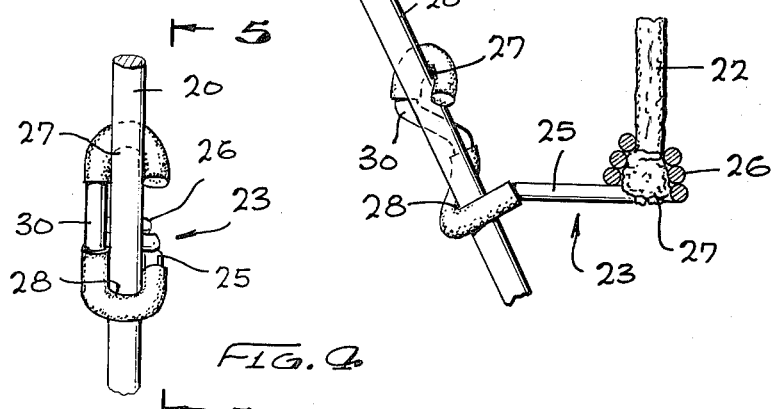
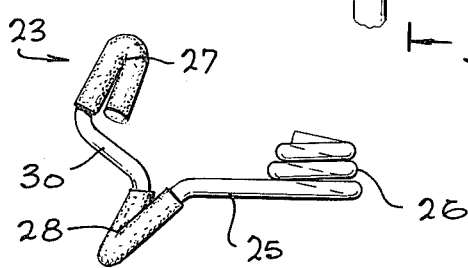
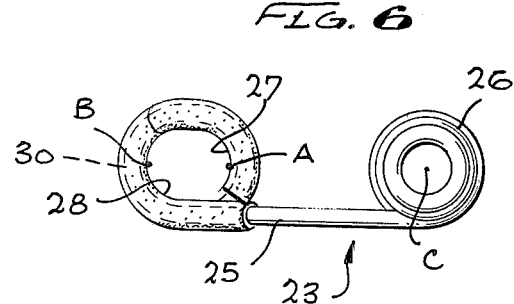

TIE DOWN CONNECTOR

BACKGROUND OF THE INVENTION

1. Field of the Invention

The present invention relates to tie down connectors and more particularly to a novel connector adapted to coextend between the hooked end of a spring bungee cord and a supporting element.

2. Brief Description of the Prior Art

In the past, spring bungee cords have been used as tie down devices for a plurality of articles which are carried on a platform. As one example, bungee cords have been wrapped about books or the like carried on a bicycle rack and the hooked opposite ends of the bungee cord are releasably coupled to a portion of the bicycle frame. In most instances, the hooked ends are connected to an angled support of the bicycle rack.

Difficulties and problems have been encountered when the hooked end of a bungee cord is intended to be coupled to an angled element for support inasmuch as the spring bias of the cord has a tendency to cause the hooked end to ride along the angle of the supporting element. In most such instances, tension is then taken from the load on the rack and the load will slip or otherwise become dislodged from its position on the rack. Obviously, this is to be avoided since it is this dislodgement that the bungee cord is intended to prevent.

Therefore, there has been a longstanding need to provide a tie down connector or device which will readily accommodate the hooked end of a bungee cord to a sloping, slanting or angled support element whereby the load intended to be held in place by the bungee cord will remain stationary and will not be inadvertently dislodged.

SUMMARY OF THE INVENTION

Accordingly, the above problems and difficulties have been obviated by the present invention which provides a normal tie down connector for securing the hooked end of a bungee cord to a slanting or angled supporting element. In one form of the invention, the tie down connector includes an elongated body section having a conical receptacle at one end for detachably connecting the hooked end of a bungee cord thereto. The opposite end of the body section is integrally formed with a pair of sockets that are coaxially disposed with respect to one another and wherein each of the sockets includes a lateral opening or entrance leading thereto whereby the entrances or openings of the respective sockets face in different and opposite directions. Means are provided between the end of the body section and the pair of sockets maintaining the sockets in coaxial relationship but modified so that the supporting element may be readily manipulated through a pliable or split portion of the device so that the supporting element can be insertably received in a simultaneous manner through the openings leading into the pair of sockets.

In further detail, the invention includes arcuate segments forming the sockets which operate as load bearing areas which are established as contact points for engaging with the supporting element for load transferring purposes and for bearing against the supporting element so as to prevent sliding or slippage thereof.

Therefore, it is among the primary objects of the present invention to provide a novel tie down connector which will readily couple the hooked end of a bungee cord to a slanted, sloped or otherwise inclined supporting element so that the hooked end will not slip or ride on the supporting element.

Another object of the present invention is to provide a novel tie down connector which is integral in its construction and which includes load bearing portions adapted to bear against an angled or slanting supporting element whereby the connector will not slide or ride thereon.

Still another object of the present invention is to provide an inexpensive and economical tie down connector that may be readily manipulated by the fingers of the user to be installed on a supporting brace which is angularly disposed with respect to the load placed thereon by the hooked bungee cord.

Yet another object of the present invention is to provide a novel tie down connector which includes a double socket arrangement in co-axial relationship carried on one end of a body section while its opposite end carries a receptacle intended to be coupled with the hooked end of a bungee cord.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of a bicycle incorporating the tie down connector of the present invention for holding a load onto a supporting rack in combination with a spring-loaded bungee cord;

FIG. 2 is an enlarged perspective view of one form of the tie down connector used in the illustration of FIG. 1;

FIG. 3 is a side elevational view of the tie down connector shown in FIG. 2;

FIG. 4 is an end view of the tie down connector shown in FIGS. 2 and 3;

FIG. 5 is a cross-sectional view of the tie down connector illustrated in the general direction of arrow 5—5 of FIG. 4;

FIG. 6 is a top plan view of the tie down connector shown in FIGS. 2-5 and illustrating load bearing points or areas established thereon;

DESCRIPTION OF THE PREFERRED EMBODIMENT

Figure 7:
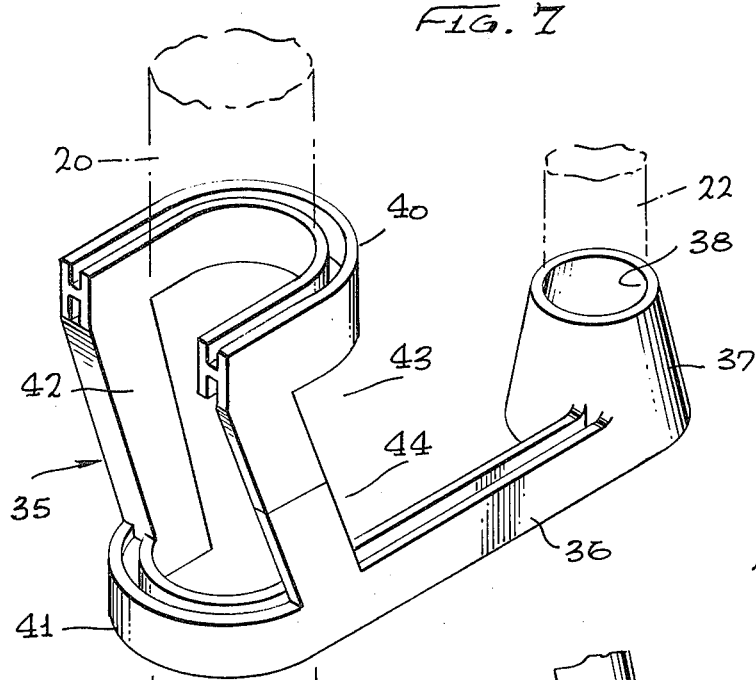
FIG. 7 is an enlarged perspective view of another version of the tie down connector.

Referring to FIG. 1, a bicycle is illustrated which comprises a frame 10 having a bar support 11 and an additional bar support 12. The bar supports are rigidly connected together and comprise the frame of the bicycle along with rearwardly extending wheel supports or braces 13 and 14. The braces 13 and 14 are joined together at an axle fitting 15 for receiving the axle of a wheel 16. As is the conventional construction, a rack or carrier 17 is included which is mounted to the frame at one end by fasteners 18 and to the axle fitting 15 by means of an angular or slanted support element or rod 20. A load, taking the form of books or the like, are indicated by numeral 21 and the load is intended to be held in place on the rack or carrier 17 by a conventional spring bungee cord 22.

The novel tie down connector of the present invention is illustrated in the general direction of arrow 23 and is illustrated as inter-connecting a selected hook end 24 of the spring bungee cord with the slanted supporting element or rod 20. In the event that the hooked end 24 were to be engaged with the underside of the supporting element 20, the hook would rife upwardly under the contracting spring tension of the bungee cord and its effectiveness for holding the load 20 in place would be greatly reduced. The same result would occur if the hooked end 24 were to be placed about the brace 13 it is also of a slanting or angular disposition.

Referring now in detail to FIGS. 2-5 inclusive, it can be seen that the tie down connector 23 of the present invention includes an elongated linear body section 25 having a conically disposed receptacle 26 carried on one end thereof for receiving a selected end of the bungee cord. In the present illustration, the hook normally carried on the end has been removed and the cord is tied in a knot 27 as shown more clearly in FIG. 5 wherein the knot is drawn into the conical receptacle and thereby held in place. The conical receptacle 26 is formed from the linear body section 25 by wrapping the wire length into coiled construction so that at least three coils are defined. Each coil is of a different diameter so that a conical receptacle is defined interiorally of the combined end co-axially disposed coils. The opposite of the body section 25 is provided with a pair of open sockets 27 and 28. It can be seen that the opening to the respective sockets is 180° apart so that the openings face in opposite directions and that the pair of sockets are held together by an intermediate section 30 which is curved or twisted so as to provide the opposite opening facings to the respective sockets. Construction in this manner permits installation on the supporting element or rod 20 by first inserting the element through the opening into the socket 28 followed by twisting the sockets until another portion of the supporting element enters the socket 27. At this time, the bias from the bungee cord 22 will pull the connector so that load bearing points A and B will transfer loads from the bungee cord and the connector directly into the supporting element. The points of load transference are shown more clearly in FIG. 6 as wll as the co-axial relationship in respect to the coils defining the conical receptacle having a co-axial center indentified by the letter C.

Referring now in detail to FIG. 7, another embodiment of the present invention is shown in the general direction of arrow 35 which includes a linear face section 36 terminating in one end in a conical receptacle 37 having a tapered or conical bore 38 for receiving the knotted end of the bungee cord as previously described. The opposite end of the body section 26 is provided with a double socket arrangement or a pair of sockets which are defined by semicircular or arcuate portions identified by numerals 40 and 41 respectively. The socket 41 is considered the lower socket and is connected to the upper socket 40 by means of an interconnecting linear portion 42. The opposite side of the tie down connector 35 also includes a pliable side formed with flaps 43 and 44 that may be readily separated to permit insertion of the supporting element 20 thereto during installation.

Figure 9:
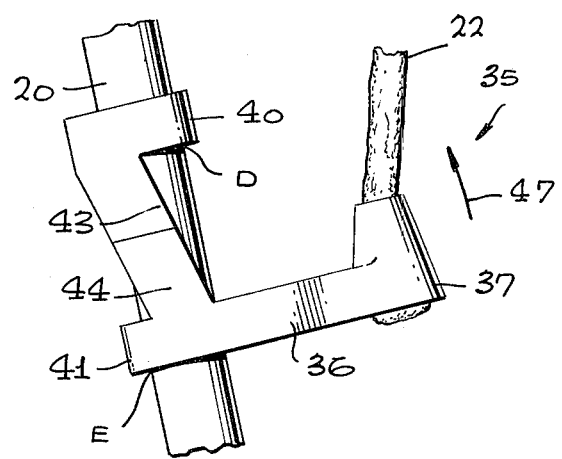
FIG. 9 is a side elevational view of the tie down connector shown in FIGS. 7 and 8 in a typical application.
Figure 8:
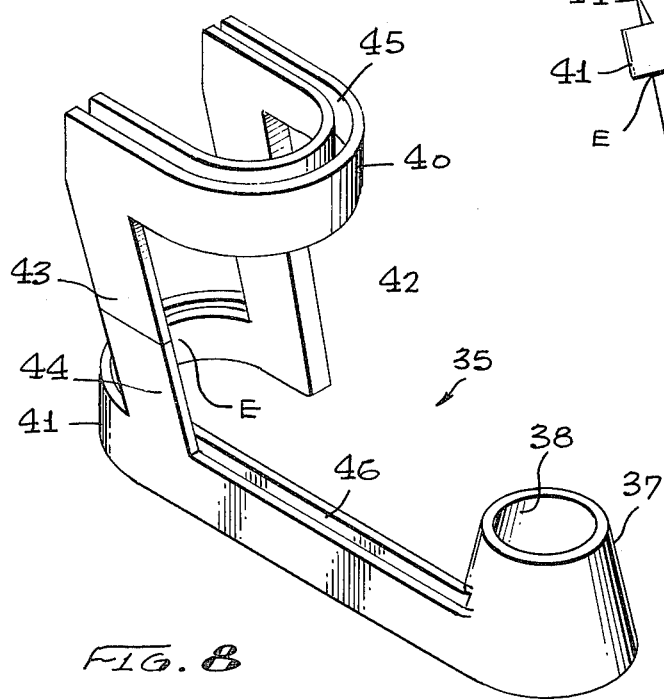
FIG. 8 is a perspective view from the opposite end of the tie down connector from the end shown in FIG. 7.

Referring now in detail to FIGS. 8 and 9, it can be seen that the tie down connector 35 forms a one piece construction which may be readily molded from any suitable plastic or plastic-like material. In order to save material and reduce cost, channels are provided which are identified by numerals 45 and 46 representing lightening means.

FIG. 9 also shows that when the tie down connector is installed on the supporting element 20, the bias of the bungee cord 22 causes the connector 35 to pivot in the direction of arrow 36 so that the arcuate portion defining the sockets 40 and 41 bear against the opposite of the supporting element at points D and E respectively.

Figure 10:
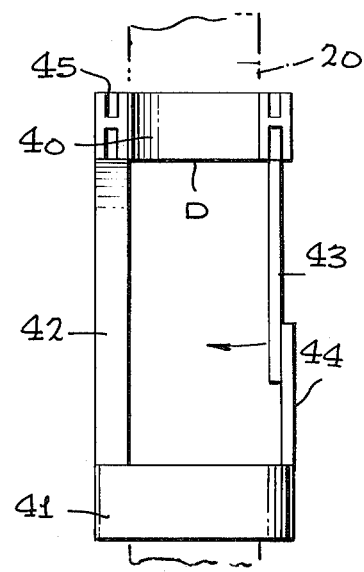
FIG. 10 is an end elevational view of the tie down connector shown in FIGS. 7-9 inclusive.

Referring now in detail to FIG. 10, it can be seen that the flaps 43 and 44 are pliable and may be readily deformed to accept the insertion of the support element 20 there through.

In view of the foregoing, it can be seen that the tie down connector of the present invention whether taking the form of connector 23 or that of connector 35 will readily accept the knotted end of the bungee cord 22 and releasably secure the end to a hook supporting element such as the rod 20. Once the connector has been so affixed, the connector will not ride or otherwise move upwardly under the pressure of the bias of the bungee cord.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tie down connector for releasably securing the end of a bungee cord comprising the combination of:
    a bungee cord;
    an elongated body terminated at one end in a holder section provided with a pair of registered and coaxially disposed semi-circular U-shaped recessed portions axially spaced a distance substantially equal to twice the depth of a recess and terminated at its other end in a conical, open-ended receptacle;
    said holder semi-circular U-shaped portions characterized as a retainer arrangement having spaced apart recesses opening from opposite directions;
    a connection element integrally disposed and joined between said pair of semi-circular U-shaped portions to separate and maintain said recesses in substantially fixed and spaced apart relationship;
    said bungee cord extending from the small end of the conical receptacle;
    a knot carried on the end of said bungee cord having a physical size greater than the opening in said conical receptacle of said body and secured therein so that said bungee card is retained thereon.

2. The invention as defined in claim 1 wherein:
    a second connection element disposed in fixed parallel relationship to said first mentioned connection element;
    said second connection element having a split midway between its opposite ends so as to be characterized as deformable into defining a gated opening therethrough.

3. The invention as defined in claim 2 wherein:

said conical receptacle is provided with an open ended hole having a central axis; and said recesses of said holder section being open ended and having a central axis parallel to and in spaced relationship with said central axis of said conical receptacle.

4. The invention as defined in claim 3 wherein:

said second connection element comprises a pair of lateral members having one end of each integrally carried on each one of said semicircular U-shaped sections and their opposite ends overlapped.

5. The invention as defined in claim 4 wherein:

each of said U-shaped sections includes a load bearing point at the arcuate portion of the U-shape; and said load bearing points being opposite and opposing to each other.

6. The invention as defined in claim 5 wherein:

said body, said conical receptacle and said U-shaped holder sections are formed of a single strand of wire wound about itself.

7. The invention as defined in claim 5 including:

said bungee cord having said knot at one end adapted to be insertably received into said conical receptacle; and a support member adapted to be insertably received into said U-shaped sections via said openings facing in opposite directions.

* * * * *